(12) United States Patent
Steen et al.

(10) Patent No.: US 9,775,288 B2
(45) Date of Patent: Oct. 3, 2017

(54) ROTARY CUTTING DECK WITH ASYMMETRIC REAR DISCHARGE OPENING

(71) Applicant: Deere & Company, Moline, IL (US)

(72) Inventors: Chad C. Steen, Holly Springs, NC (US); Aaron Dubach, Greenville, TN (US)

(73) Assignee: Deere & Company, Moline, IL (US)

( * ) Notice: Subject to any disclaimer, the term of this patent is extended or adjusted under 35 U.S.C. 154(b) by 219 days.

(21) Appl. No.: 14/633,964

(22) Filed: Feb. 27, 2015

(65) Prior Publication Data
US 2016/0249528 A1    Sep. 1, 2016

(51) Int. Cl.
*A01D 67/00* (2006.01)
*A01D 34/71* (2006.01)

(52) U.S. Cl.
CPC .................... *A01D 34/71* (2013.01)

(58) Field of Classification Search
CPC ........ A01D 34/71; A01D 34/82; A01D 34/81; A01D 2101/00
USPC ........................ 56/6, 320.1, 320.2
See application file for complete search history.

(56) References Cited

U.S. PATENT DOCUMENTS

| | | | | |
|---|---|---|---|---|
| 2,815,634 A * | 12/1957 | Bush | A01D 34/685 | 280/47.36 |
| 2,857,727 A * | 10/1958 | Cole | A01D 34/71 | 56/255 |
| 2,942,400 A * | 6/1960 | Sylvester | A01D 34/63 | 56/17.4 |
| 3,696,595 A * | 10/1972 | Dahl | A01D 43/077 | 56/16.9 |
| 3,706,190 A * | 12/1972 | Taub | A01D 34/71 | 56/13.4 |
| 3,851,452 A * | 12/1974 | Brocas | A01D 34/828 | 56/17.4 |
| 4,736,576 A * | 4/1988 | Mallaney | A01D 34/81 | 56/13.4 |
| 4,897,988 A * | 2/1990 | Schweitz | A01D 43/0631 | 56/17.4 |
| 4,899,526 A * | 2/1990 | Harris | A01D 34/81 | 264/46.6 |
| 5,117,616 A * | 6/1992 | McLane | A01D 34/005 | 56/17.5 |
| 5,408,815 A * | 4/1995 | Forte | A01D 34/005 | 241/101.1 |
| 5,410,867 A * | 5/1995 | Plamper | A01D 42/005 | 49/386 |
| 6,047,530 A | 4/2000 | Bednar | | |
| 6,336,311 B1 | 1/2002 | Bednar | | |
| 6,470,663 B2 | 10/2002 | Langworthy et al. | | |
| 6,484,481 B1 | 11/2002 | Langworthy et al. | | |
| 7,716,907 B2 | 5/2010 | Joliff et al. | | |
| 8,127,522 B2 | 3/2012 | Campbell | | |
| 2010/0037578 A1* | 2/2010 | Jolliff | A01D 34/74 | 56/14.9 |

\* cited by examiner

*Primary Examiner* — Thomas B Will
*Assistant Examiner* — Mai Nguyen

(57) ABSTRACT

A rotary cutting deck having an inverted dish-shaped cutting chamber supported by a framework carrying a plurality of ground engaging members, a rotary cutting blade mounted to a spindle extending through the cutting chamber, an asymmetric rear discharge opening above the rotary cutting blade, and a band below the opening.

7 Claims, 3 Drawing Sheets

ROTARY CUTTING DECK WITH ASYMMETRIC REAR DISCHARGE OPENING

FIELD OF THE INVENTION

The present invention relates to grass mowing machines for golf course roughs, and more specifically to a rotary cutting deck for mowing golf course roughs.

BACKGROUND OF THE INVENTION

Many new and existing golf courses have narrowed their fairways and expanded their rough areas on either side of the fairways. Roughs require less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

However, golf course roughs still must be maintained regularly using grass mowing machines that can mow the vegetation at an acceptable length and appearance. Equipment for mowing golf course roughs typically includes a traction vehicle carrying three or more rotary cutting decks, each rotary cutting deck mounted on the end of a lift arm extending from the traction vehicle. Carrying the rotary cutting decks with lift arms extending from the front or sides of the traction vehicle is necessary and desirable, instead of towing the rotary cutting decks behind the vehicle, because it is necessary for the mower to provide close trims next to trees, bunkers or other hazards. Each lift arm also may be used to move a rotary cutting deck between a mowing position and a transport position. The mounting devices also should allow for pitch (front to back pivoting) and yaw (side-to-side pivoting) of the rotary cutting decks.

Traction vehicles carrying several rotary cutting decks may travel at speeds of 6 to 8 miles per hour when mowing golf course roughs. The traction vehicle's weight may be in excess of 2000 pounds. Each rotary cutting deck may be subject to shocks from impacts against the ground surface or objects during mowing. To withstand the rigorous mowing conditions, rotary cutting decks typically are made of thick sheet steel, such as 7 gage or 10 gage sheet steel. Each rotary cutting deck may have a diameter between about 18 inches and 27 inches, weigh at least 120 pounds, and may have a cutting blade rotated by a hydraulic or electric motor.

Rotary cutting decks for mowing golf course roughs typically include a rear discharge opening. Grass clippings may exit the deck through the rear discharge opening such that the clippings may lie on top of the turf. If the deck encounters heavy or thick grass or vegetation, the deck may become clogged and the cut clippings may be deposited in clumps instead of dispersing evenly through the discharge opening. A rotary cutting deck with a rear discharge opening is needed that reduces the possibility that the deck may become clogged, and that disperses grass clippings evenly and not in clumps.

Rotary cutting decks also should provide high cut quality, even on golf course roughs. If grass clippings collect under the deck, they may block the rotary cutting blade from cutting all of the grass at the specified height. A rotary cutting deck with a rear discharge opening is needed that provides high cut quality.

Golf course operators have attempted to reduce noise generated by mowing equipment. A rotary cutting deck is needed that operates with low noise. In the past, rear discharge openings have been designed by cutting large rear openings in the back wall of the deck. For example, U.S. Pat. No. 6,470,663 relates to a rear discharge opening formed by a cut-away portion of a peripheral wall of the cutting chamber. The large rear opening may help prevent the deck from clogging, but also may result in poor dispersion of clippings. Additionally, a large rear opening may require a bolt on bar or a long discharge chute to meet the foot probe test for safety requirements. A rotary cutting deck is needed that meets safety requirements and minimizes risk of injury to operators or bystanders.

SUMMARY OF THE INVENTION

A rotary cutting deck includes a cutting chamber having a rear wall with an asymmetric rear discharge opening. The opening increases in height and cross section in the direction of rotation of the rotary cutting blade. A band that is integral with the rear wall of the cutting chamber is provided below the opening and around the rear wall of the cutting chamber in the generally horizontal plane of the rotary cutting blade. The asymmetric rear discharge opening reduces the possibility that the deck may become clogged, and disperses grass clippings evenly and not in clumps. The asymmetric rear discharge opening also operates with reduced noise, meets safety requirements and minimizes risk of injury to operators or bystanders.

DESCRIPTION OF THE PREFERRED EMBODIMENT

Figure 1:
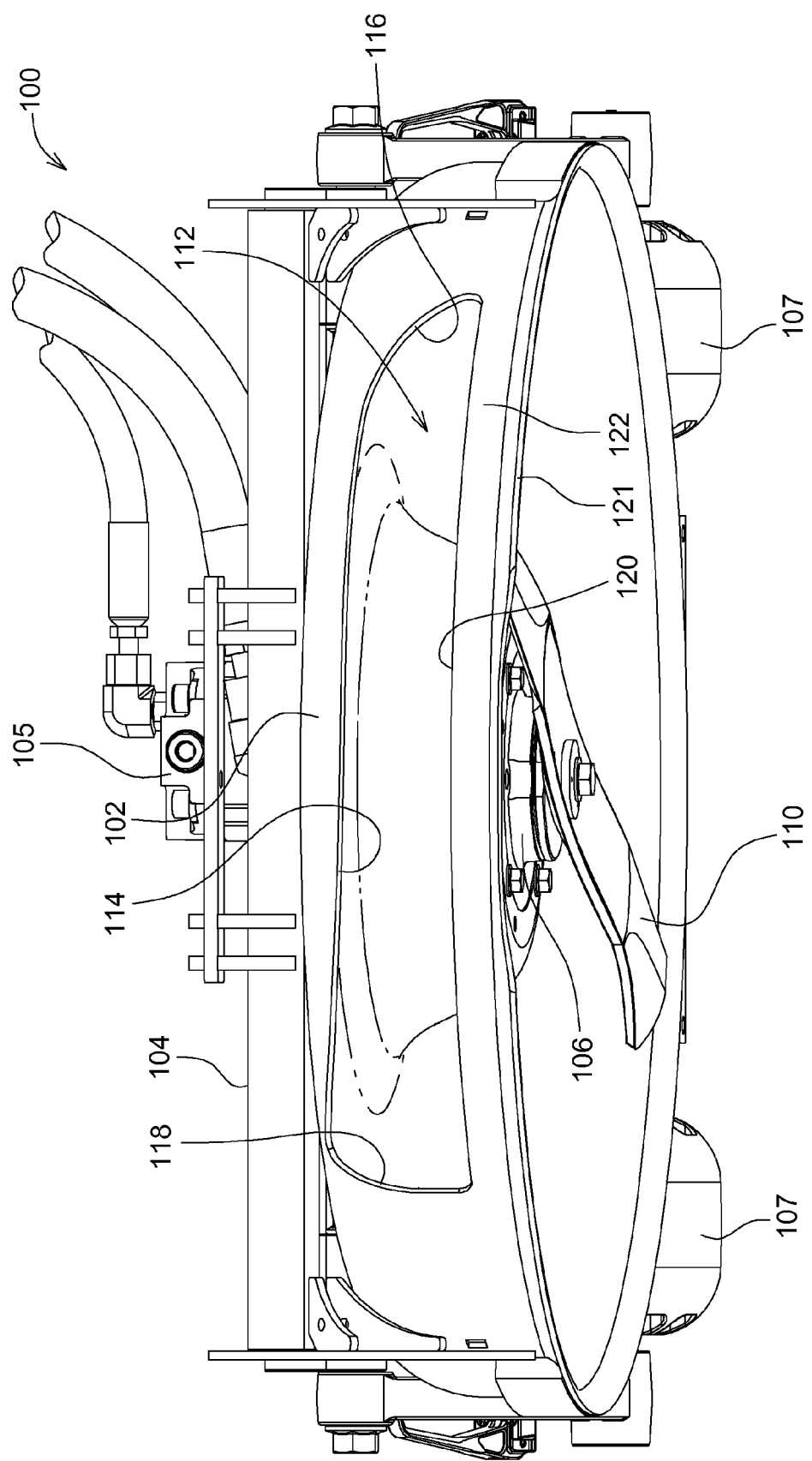
FIG. 1 is a perspective view of a rotary cutting deck with an asymmetric rear discharge opening according to a first embodiment of the invention.
Figure 2:
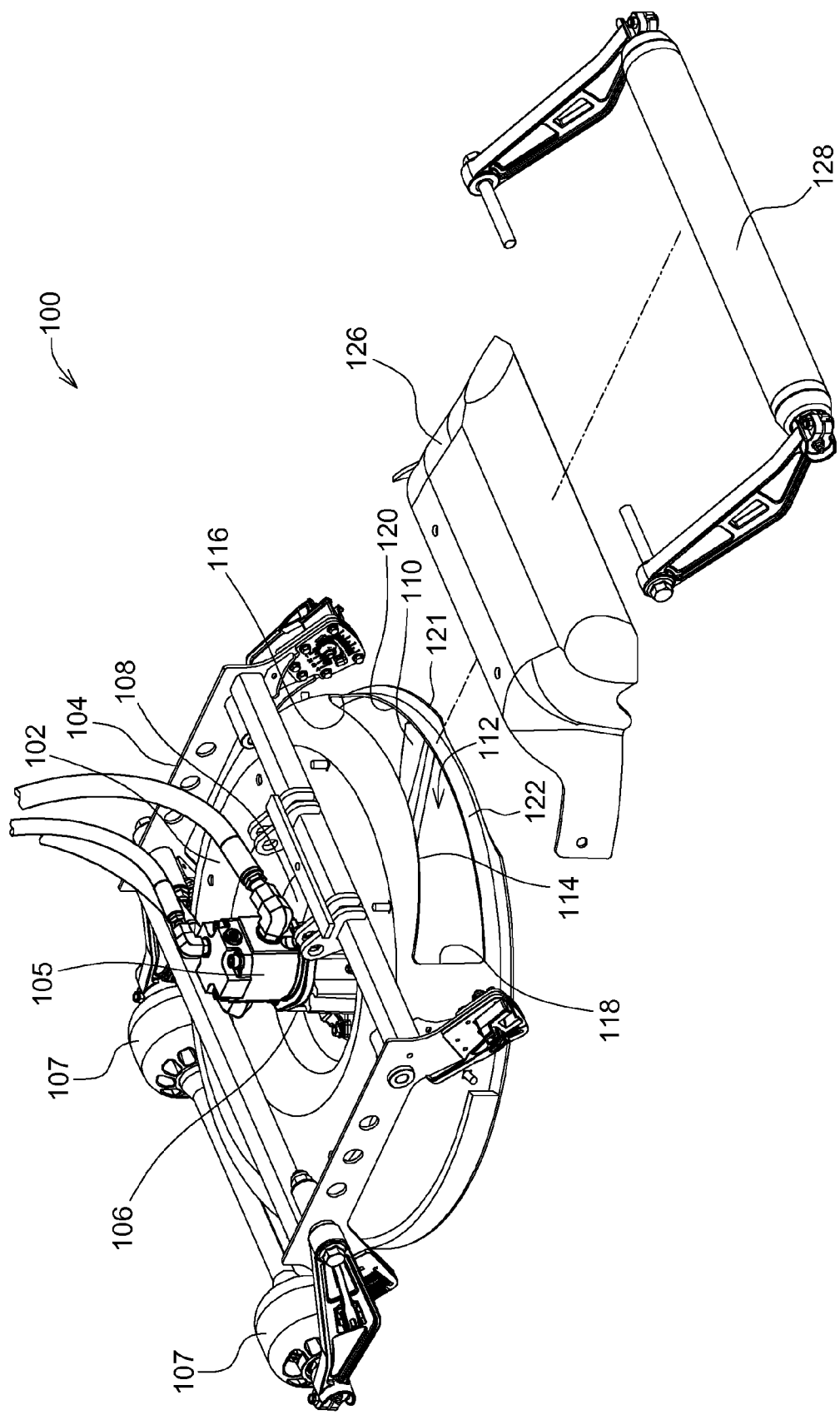
FIG. 2 is an exploded perspective view of a rotary cutting deck with an asymmetric rear discharge opening according to a first embodiment of the invention.
Figure 3:
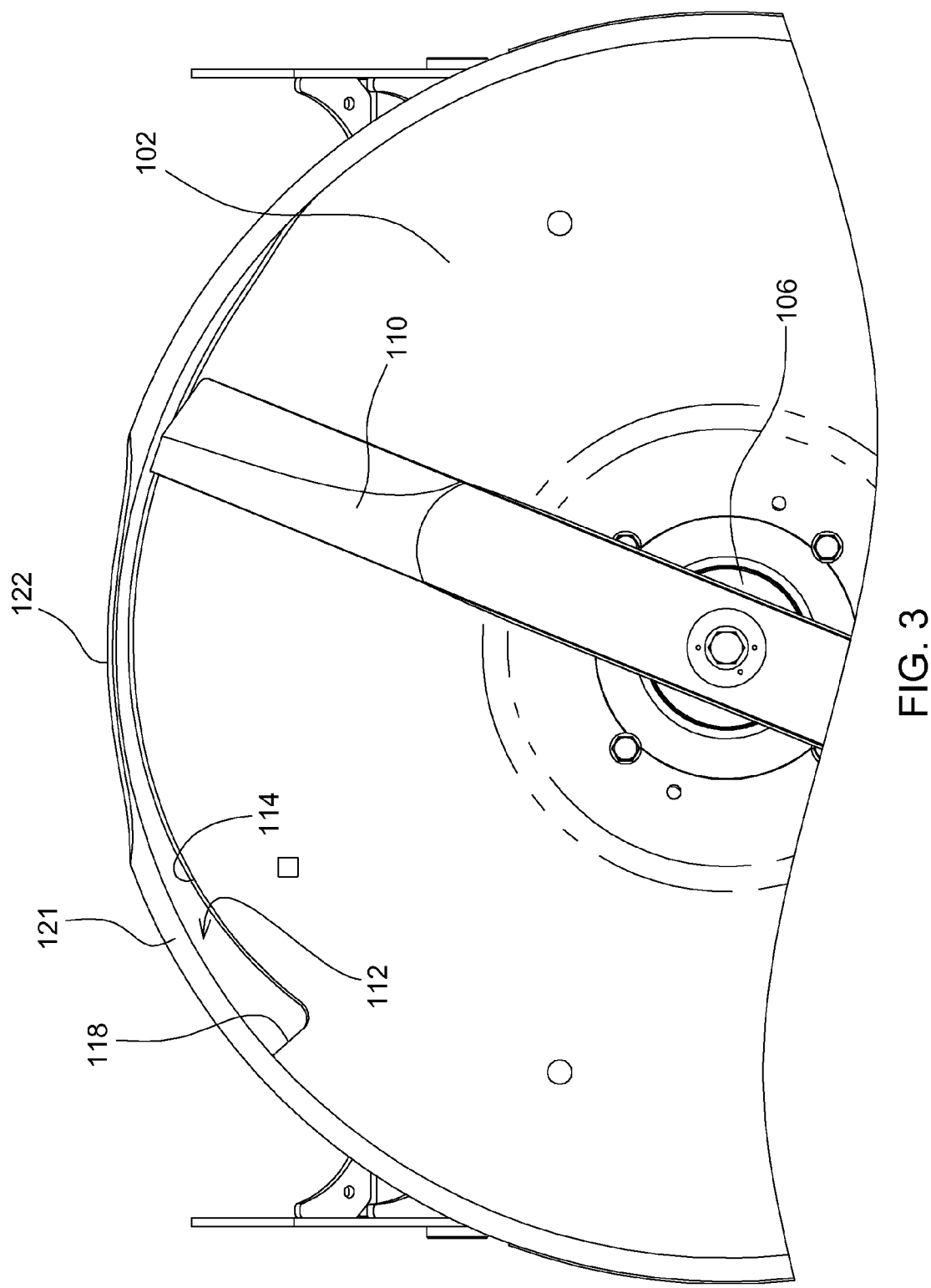
FIG. 3 is a bottom view of a rotary cutting deck with an asymmetric rear discharge opening according to a first embodiment of the invention.

As shown in FIGS. 1-3, in a first embodiment, rotary cutting deck 100 includes a circular inverted dish-shaped cutting chamber 102. A motor such as hydrostatic motor 105 may be mounted to a recess 108 in the top surface of the rotary cutting deck. The motor turns rotary cutting blade 110 attached to a generally vertically aligned spindle extending from the motor under the deck. The rotary cutting deck may be supported over the ground surface by framework 104 carrying ground engaging members at the front and rear of the deck, such as front pair of rollers 107 and a rear roller 128.

In one embodiment, three or more rotary cutting decks 100 may be mounted to a traction vehicle. Each rotary cutting deck may be pivotably supported at the end of a lift arm which the operator may actuate with one or more hydraulic cylinders or electric lift mechanisms to raise or lower the rotary cutting decks between mowing positions and transport positions.

In one embodiment, asymmetric rear discharge opening 112 may be provided through the rear wall of cutting chamber 102, and preferably less than about 45 degrees around the perimeter at the rear of the cutting chamber. The asymmetric rear discharge opening may be located above the generally horizontal plane of rotary cutting blade 110. The rotary cutting blade may rotate in a direction approaching first end 116 of the asymmetric rear discharge opening before reaching second end 118 which has a larger height and cross sectional area.

In one embodiment, asymmetric rear discharge opening 112 may have a generally horizontal lower edge or lip 120. The lower edge or lip 120 may be less than about 3 inches above the bottom edge 121 of the rotary cutting deck. The lower edge or lip 120 also may be located above the generally horizontal plane of rotary cutting blade 110.

In one embodiment, the rear wall of cutting chamber 102 may include a band or strap 122 below the lower edge or lip 120 of the opening. Band or strap 122 may be at or adjacent the horizontal plane of the rotary cutting blade. Preferably, band or strap 122 may be integral with the cutting chamber rear wall and may terminate at the bottom edge 121 of the rotary cutting deck. The bottom edge 121 may extend radially outwardly slightly from the band or strap 122.

In one embodiment, asymmetric rear discharge opening 112 may have an upper edge or lip 114 that slopes or curves upwardly and away from lower edge or lip 120. The slope or curvature of the upper edge or lip 114 may increase adjacent the second end 118 of the opening. Near second end 118, the upper edge or lip 114 also may extend radially inwardly on the inverted dish-shaped surface of the cutting chamber. As shown in FIG. 3, part of the upper edge or lip 114 near the second end 118 may be within the radius or diameter of rotary cutting blade 110.

In one embodiment, the first and second ends of the asymmetric rear discharge opening may have different shapes or configurations. First end 116 may sloped or curve to incline upwardly from lower edge or lip 120 toward upper edge or lip 114. Second end 118 may have a generally linear vertical edge between the lower edge or lip 120 and the upper edge or lip 114.

In one embodiment, the dimensions of the asymmetric rear discharge opening also may increase from the first end to the second end. For example, at or near first end 116 of the asymmetric rear discharge opening, the height or gap between the lower edge or lip and the upper edge or lip may be less than the height or gap near second end 118. Additionally, the cross sectional area of the asymmetric rear discharge opening may increase from the first end 116 toward the second end 118, in the direction of rotation of the rotary cutting blade.

The asymmetric rear discharge opening allows grass clippings to exit the deck evenly and significantly reduces the possibility of the deck becoming clogged. Band or strap 122 under the opening acts as a foot guard. Additionally, rear discharge chute 126 may be attached to the rotary cutting deck and may extend over and behind the asymmetric rear discharge opening. The asymmetric rear discharge opening also reduces noise compared with rotary cutting decks having conventional rear discharge openings.

Having described the preferred embodiment, it will become apparent that various modifications can be made without departing from the scope of the invention as defined in the accompanying claims.

The invention claimed is:

1. A rotary cutting deck, comprising:
an inverted dish-shaped cutting chamber supported by a framework carrying a plurality of ground engaging members;
a rotary cutting blade mounted to a spindle extending through the cutting chamber; the rotary cutting blade having a radius and diameter; and
an asymmetric rear discharge opening extending partially around the cutting chamber, the opening having an upper edge that slopes upwardly and radially inwardly between a first end and a second end of the opening, whereby the upper edge adjacent the first end of the opening is outside the radius of the rotary cutting blade and the upper edge adjacent the second end of the opening is within the radius of the rotary cutting blade, and a band below the opening.

2. The rotary cutting deck of claim 1 wherein the band is integral with the cutting chamber.

3. A rotary cutting deck, comprising:
a circular inverted dish-shaped cutting chamber; a hydrostatic motor mounted to a recess in a top surface of the deck; the motor turning a rotary cutting blade attached to a generally vertically aligned spindle extending from the motor under the deck; a framework supporting the cutting chamber and carrying a front pair of rollers and a rear roller; and
an asymmetric rear discharge opening extending partially around the perimeter wall of the cutting chamber; the opening having an upper edge that slopes upwardly and radially inwardly between a first end and a second end of the opening, whereby the upper edge adjacent the first end of the opening is outside a radius of the rotary cutting blade and the upper edge adjacent the second end of the opening is within the radius of the rotary cutting blade; and a portion of the rear wall of the cutting chamber forming a band below the opening.

4. The rotary cutting deck of claim 3 wherein the band is located at a horizontal plane of rotation of the rotary cutting blade.

5. A rotary cutting deck, comprising:
an inverted dish-shaped cutting chamber covering a rotary cutting blade rotating in a generally horizontal plane and powered by a hydrostatic motor;
the cutting chamber having a rear wall with an asymmetric rear discharge opening having an upper edge that inclines upwardly and radially inwardly in the direction of rotation of the rotary cutting blade, whereby only a part of the upper edge is within a radius of the rotary cutting blade; and
a band integral with and extending around the rear wall of the cutting chamber in the generally horizontal plane of the rotary cutting blade.

6. The rotary cutting deck of claim 5 wherein the asymmetric rear discharge opening is around less than 45 degrees of the cutting chamber.

7. The rotary cutting deck of claim 5 wherein the asymmetric rear discharge opening has a curved upper edge.

* * * * *